(12) United States Patent
Donaldson et al.

(10) Patent No.: US 12,096,536 B2
(45) Date of Patent: Sep. 17, 2024

(54) POWERLINE COMMUNICATIONS FOR LIGHTING SYSTEMS

(71) Applicant: SEALITE USA LLC, Tilton, NH (US)

(72) Inventors: Doug Donaldson, Kenmore, WA (US); David Mark Shemwell, Newcastle, WA (US); Josh Putaansuu, Penacook, NH (US)

(73) Assignee: SEALITE USA LLC, Tilton, NH (US)

( * ) Notice: Subject to any disclaimer, the term of this patent is extended or adjusted under 35 U.S.C. 154(b) by 137 days.

(21) Appl. No.: 17/590,993

(22) Filed: Feb. 2, 2022

(65) Prior Publication Data
US 2023/0247747 A1   Aug. 3, 2023

(51) Int. Cl.
*H05B 47/185* (2020.01)
*H04B 3/54* (2006.01)
*H05B 45/37* (2020.01)

(52) U.S. Cl.
CPC ............. *H05B 47/185* (2020.01); *H04B 3/54* (2013.01); *H05B 45/37* (2020.01)

(58) Field of Classification Search
CPC ......... H05B 47/185; H05B 45/37; H04B 3/54
See application file for complete search history.

(56) References Cited

U.S. PATENT DOCUMENTS

| 2012/0133298 A1* | 5/2012 | Campbell | H05B 47/185 315/250 |
| 2015/0357866 A1* | 12/2015 | Kolsky | H04B 3/54 307/2 |
| 2020/0213005 A1* | 7/2020 | Cregg | H04W 24/08 |

FOREIGN PATENT DOCUMENTS

WO   WO-2015008878 A1 *  1/2015   ............... H04B 3/54

OTHER PUBLICATIONS

Extended European Search Report issued for European Patent Application 23 154 706.8 dated May 8, 2023, 9 pages.

* cited by examiner

*Primary Examiner* — Quan Zhen Wang
*Assistant Examiner* — Rajsheed O Black-Childress
(74) *Attorney, Agent, or Firm* — Husch Blackwell LLP

(57) ABSTRACT

A lighting system uses AC power lines to distribute both power and control signalling from a Powerline Communication (PLC) control transmitter to a number of lighting modules. Each lighting module has PLC communication and digital control circuitry for operating a DC lighting element. Power is fed from the AC power lines to a AC/DC power via electrical filtering which substantially blocks absorption of signals in the PLC control signal band, allowing PLC control signals greater range along the AC power lines. Each lighting module may be adapted to ignore, after receiving a first command from the PLC control transmitter, subsequent commands from the PLC control transmitter for a period of time. The period of time may be signalled from the PLC control transmitter or determined by each lighting module. In this period the lighting module may repeat a previously received command or send other traffic over PLC.

7 Claims, 3 Drawing Sheets

POWERLINE COMMUNICATIONS FOR LIGHTING SYSTEMS

BACKGROUND

This disclosure pertains to the automation of lightings such as aircraft field lighting systems.

SUMMARY

A lighting system uses AC power lines to distribute both power and control signalling from Powerline Communication (PLC) control transmitter to a number of lighting modules. Each lighting module has PLC circuitry connected to the AC power lines, a digital controller connected to the PLC circuitry, an AC powerline interface connected to the AC power lines, an AC/DC power converter connected to the AC powerline interface, and a DC lighting element connected to the AC/DC power converter, wherein the DC lighting element is controlled by the digital controller. The AC powerline interface of each lighting module has electrical filtering substantially blocking the absorption of signals in PLC control signal band, allowing PLC control signals greater range along the AC power lines.

The controller of each lighting module may be adapted to ignore, after receiving a first command from the PLC control transmitter, subsequent commands from the PLC control transmitter for a period of time. The period of time may be signalled from the PLC control transmitter or determined by each lighting module. The period in which a module ignores incoming commands may be used, for example, for the lighting module to repeat a previously received command or send other traffic over PLC.

Multiple sets of lighting modules on separate AC powerlines may be connected for PLC purposes via one or more a PLC transponders which bridge the AC powerline networks.

The lighting modules may be part of, for example, an aircraft landing lighting system such as an aircraft lighting system adapted for rapid deployment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Basic System

Figure 1:
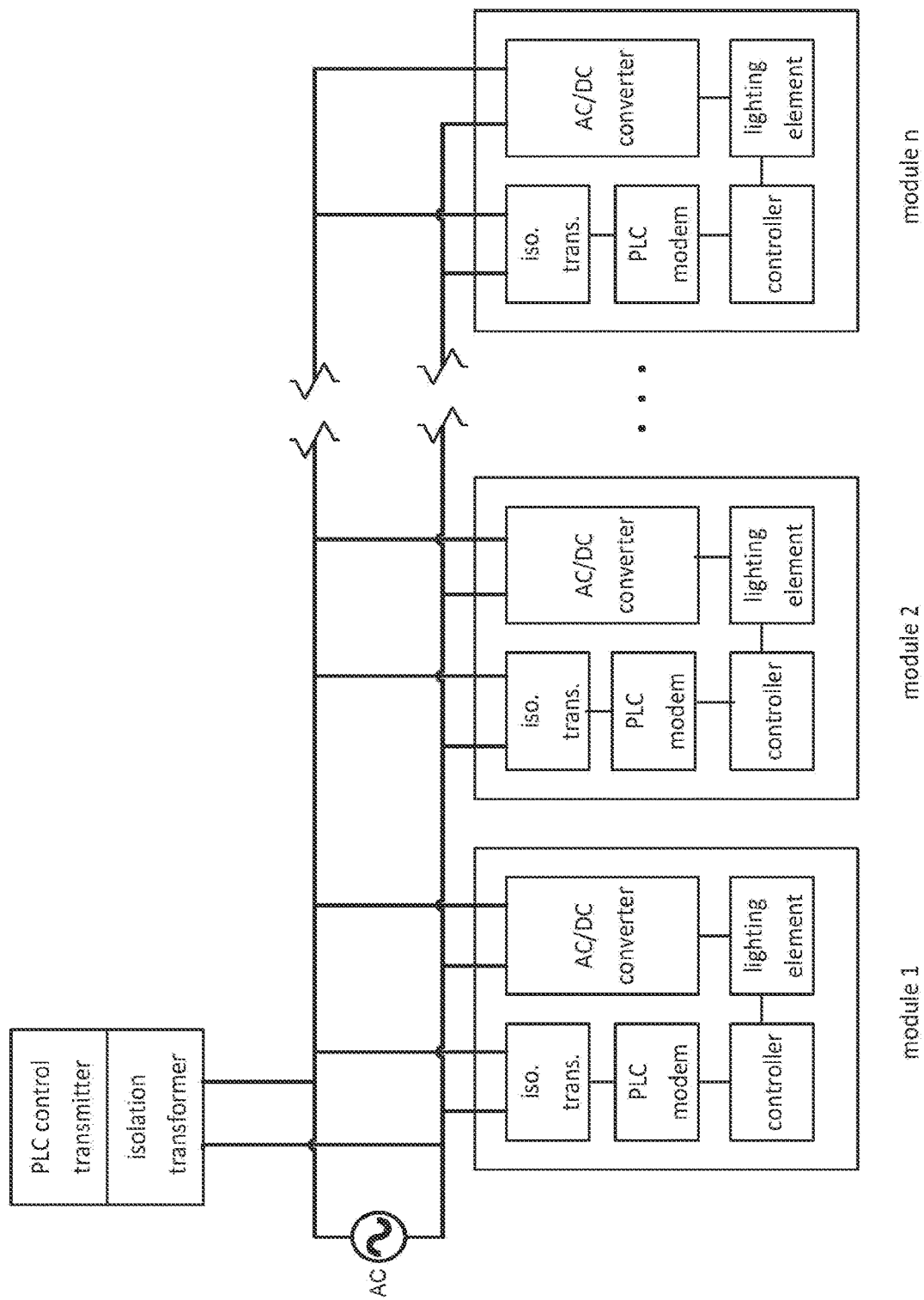
FIG. 1 is an electrical schematic of a prior art aircraft field lighting system.

FIG. 1 shows a prior art aircraft field lighting system which using powerline communications over alternating current (AC) power lines connected to a number of lighting elements. Each lighting module includes an AC/DC converter to provide DC power to for a lighting element. Each module further includes an isolation transformer and/or other electrical coupling to a powerline communication (PLC) modem. The PLC model is connected to a controller which controls PLC communications and lighting.

The AC power may be provided by a standard power distribution grid, e.g., at a nominal frequency of 50 Hz and 60 Hz. Alternatively, AC power may be provided by a generator, for example.

Powerline communications may be achieved by superimposing digitally encoded data onto power lines using various modulation schemes, typically with carrier frequencies between about 30 kHz and 800 kHz.

The communication range of a PLC transmitter is limited by resistive losses in the AC system, radiative losses in the AC system, and absorptive losses within each powered element. Thus, the size of the AC network and number of module that can be commanded by the PLC transmitter is limited.

In the example of FIG. 1, the system includes a single AC power source and a single PLC control transmitter which, again, is coupled to the AC power lines via an isolation transformer and/or another coupling mechanism. In practice, a system may include plural AC power sources, plural PLC control transmitters, and/or one or more PLC control repeaters. For example, two systems according to FIG. 1 may be joined to share communications via a PLC transponder (e.g., a repeater) that links to multiple sets of AC power lines via a separate isolation transformer for each set of AC power lines.

Improvements via Filtering

Figure 2:
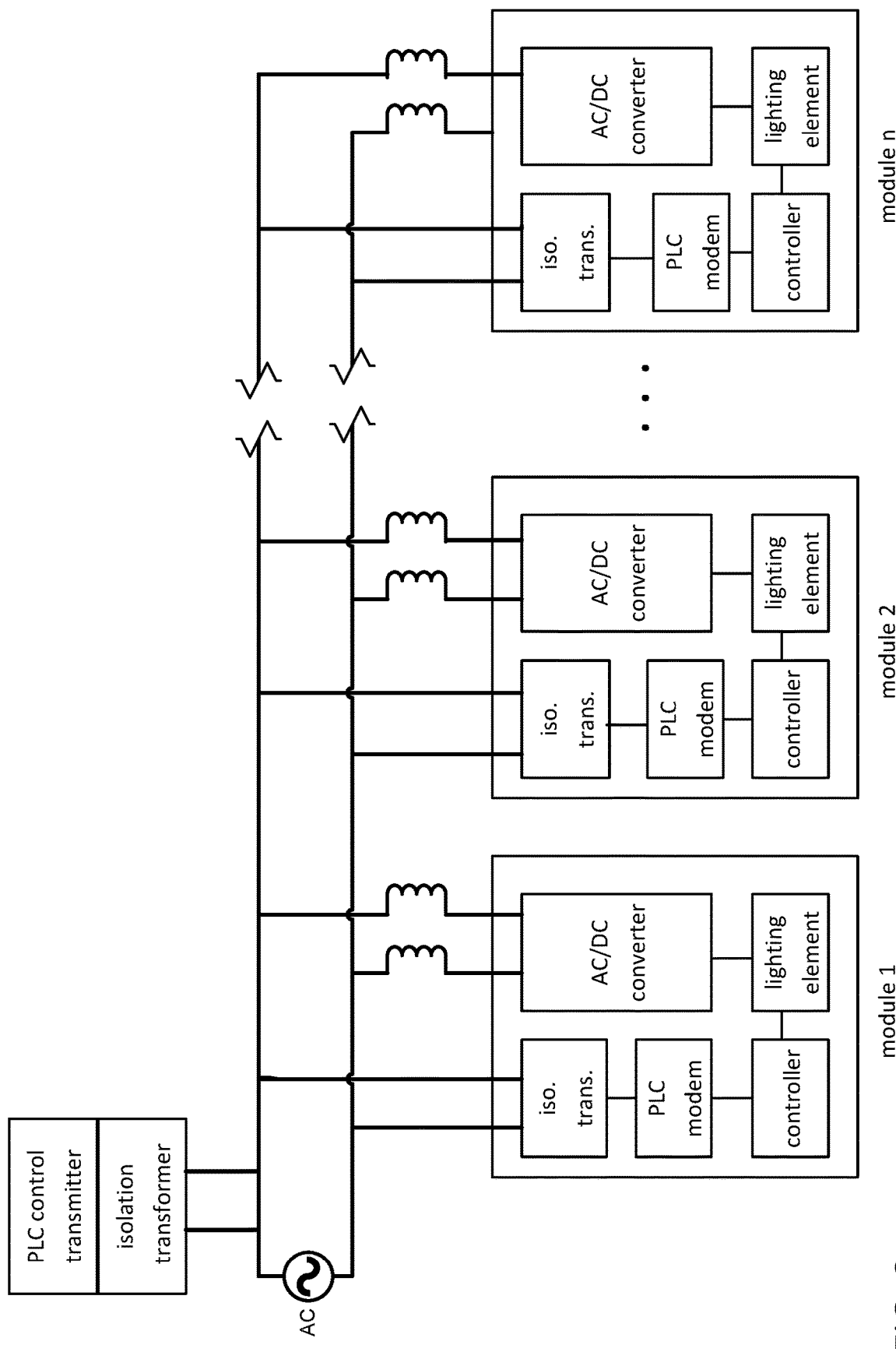
FIG. 2 is an electrical schematic of an example improved aircraft field lighting system.

FIG. 2 illustrates an improved system for reducing control signal loss in an aircraft field lighting system via electrical filtration. The system of FIG. 2 is similar to that of FIG. 1, but with filters added between the AC lines and the AC/DC converter of each module. In practice, such filters may be incorporated into each module, or installed as a separate unit.

Generally, the range of transmission of the powerline communications signal is limited by system losses including absorption of the signal by the AC/DC converters within each lighting module. The system of FIG. 2 may increase the range of transmission of the powerline communications signal in a number of ways.

For example, the filters may be low-pass and/or bandpass filters which selectively conduct energy at the AC power frequency (e.g., 50/60 Hz) while substantially preventing the powerline communication signal (e.g., circa 30-800 kHz) from entering the AC-DC converters. This filtration thus reduces absorption losses within the modules, leaving more energy in the powerline communication lines to travel further along the AC lines from the source of transmission, e.g., from the PLC control transmitter.

This may be in addition to, or incorporated in, filtering used to avoid allowing AC/DC converter noise back onto the power line. That is, filters introduced between the AC/DC converters and the power lines may specifically target the communication frequency range of the powerline communication signal (e.g., at a band within circa 30-800 kHz), as opposed to addressing a specific power conversion switcher frequency and/or harmonics thereof. For example, a band rejection filter in the range of the PLC frequency band may be employed.

This improvement in PLC range may be critical, e.g., for rapid deployment of aircraft field lighting systems, where there may be no time or resources to deploy lighting control pathways separate from the power distribution cabling. Further, this improvement allows the use of DC-powered lighting elements, which decreases the risk of electric shock and other issues associated with the use of AC lighting elements, as opposed to DC-powered lighting elements such as LEDs. Faster and safer installation, and more reliable communications, are highly prized, for example in rapid military deployments of landing lighting systems.

Message Repetition/Forwarding

Figure 3:
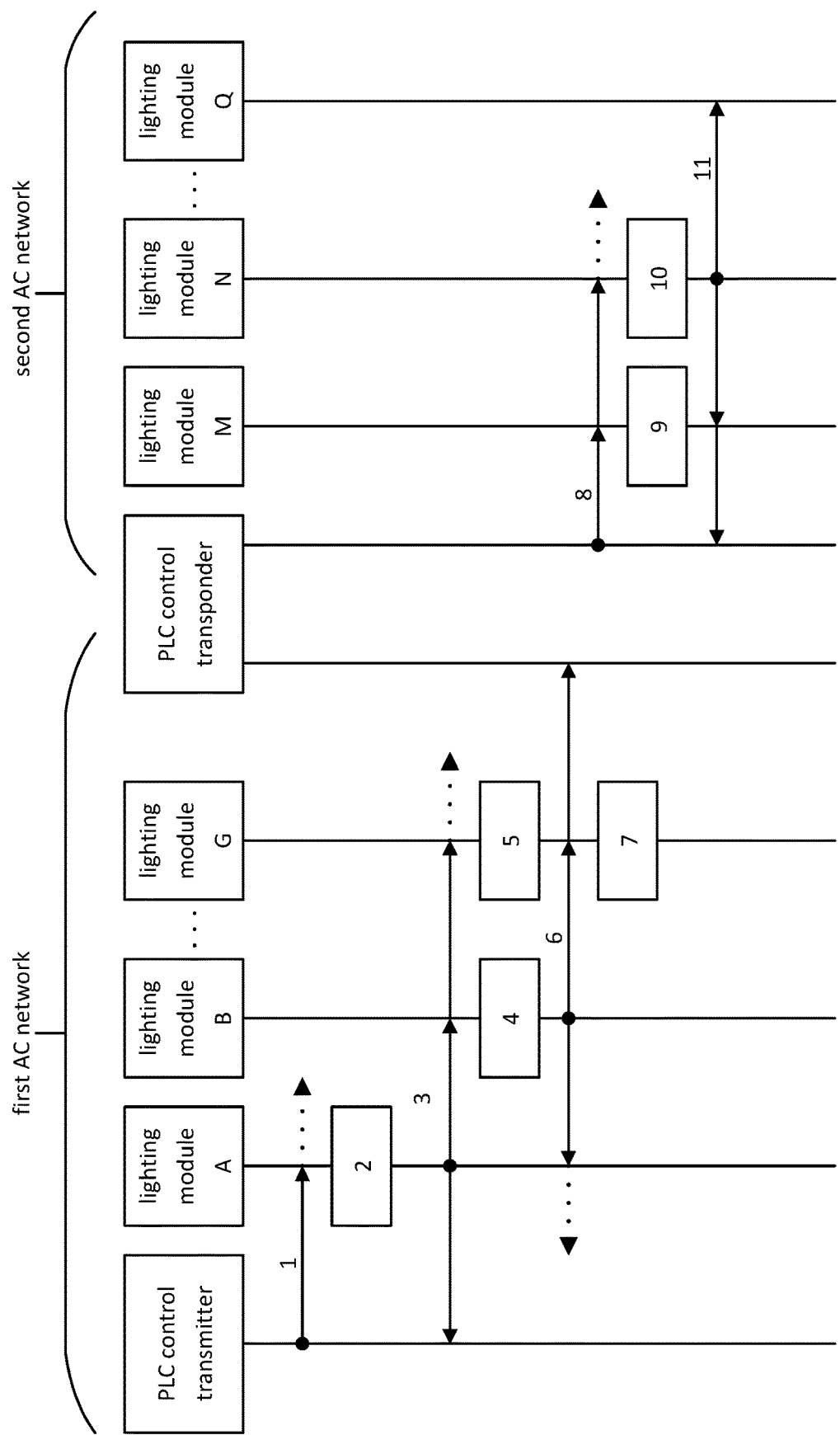
FIG. 3 is a call flow diagram illustrating an example process for message forwarding.

FIG. 3 illustrates an example process for forwarding/repeating messages in powerline communication system. In the example of FIG. 3, there is a first AC powerline network and a second AC powerline network. For example, each AC network may be powered by a separate generator and have separate power lines. The first AC network has a PLC control transmitter and a number of lighting modules A through G. The second AC network has a number of lighting modules M through Q. The PLC control transmitter and the lighting modules are similar to those described in connection to FIG. 1 and FIG. 2.

A PLC control transponder bridges the two AC networks. That is, transponder has connections to both AC networks, e.g., via separate isolation transformers. The transponder may be a dumb repeater or a smart, controller-based computer apparatus, for example.

In the example of FIG. 3, the PLC control transmitter sends a first control message, message 1, to the first AC network. However, for whatever reason, message only reaches lighting module A intact. This may be due to inference, signal attenuation via absorption or radiation, etc. Upon receiving message 1, module A starts a timer for when to repeat the message. The timer may be based on information in message 1, for instance, the type of message, prior configuration of module A, position of the module in the network, evaluation of signal conditions, and/or evaluation of prior history of transmissions on the first AC and/or second AC network, for example.

When the timer expires, module A sends message 3 to repeat the information of the message 1 for the benefit of other devices on the first AC network. Message 3 reaches back to the PLC control transmitter, which may take note of reception of message 1 by module A. Message 3 also reaches modules B through G, but not the transponder. The in steps 4 and 5, modules B and G, for example, then start their own timers for setbacks of when to repeat the contents of message 3. The time of module B expires first, and module be sends message 6, which reaches the module A, modules C through G, and the transponder. In response, module G may set a new time in step 7.

The transponder then repeats the contents of message 3 from the first AC network onto the second AC network in message 8. Not shown in FIG. 3, the transponder may also reply to the first AC network, e.g., to signify that the transponder has received message 3.

Message 8 reaches modules M and N, but not modules O through Q. In response to receiving message 8, module M starts a timer in step 9 and module starts a timer in step 10. In the example of FIG. 3, the timer of step 10 expires before the timer of step 9, and module N sends a message 11 that repeats content from message 8. Message 11 reaches module Q, and also reaches back to module M and the transponder. Again, the transponder, not shown, may report the results of where the content of message 6 reached back to the first AC network.

The modules may be configured to ignore commands received during their timer periods. That is, a module may enter a 'blackout' period during which additional commands are ignored.

The modules may be configured with multiple timers for different purposes. For example, a first timer may be used to set the blackout period, and a second timer may be used for repeating a received command. For instance, the repeat timer may be shorter than the blackout timer, such that a module retransmits a command that it has received after a short time but continues to ignore new commands after sending the retransmission.

Retransmissions may be repeated. Referring again to FIG. 3, modules A through G may keep a record of which other modules have heard which commands. Not shown, each module may be arranged to acknowledgement (ACK) and/or non-acknowledgement (NACK) messages regarding each command and may forward such ACK/NACK messages back to the PLC control transmitter. Retransmissions may be repeated a fixed number of times, for example, or until sufficient ACKs are received, or until no NACKs are received.

The timers may be configured to avoid collisions of transmissions and retransmissions. For examples, modules may have different retransmission delays to avoid interference of simultaneously transmitted commands.

The blackout periods may be set long enough to ensure that all modules within the network have received the original command or a retransmitted command during the blackout periods.

Multiple Channels

PLC signals may be transmitted and/or received on two or more channels simultaneously. For example, a first set of modules may be controlled on a first powerline control channel band and a second set of modules may be controlled on second powerline control band. Alternatively, different bands may be used for different purposes and/or for transmission redundancy.

Further, it may be desirable to control multiple AC powered networks using a single, central PLC transmitter. For example, as illustrated in FIG. 3, a transponder may be used to transmit PLC commands from one AC network to another while isolating the AC power sources from each other. The transponder may include a first PLC modem coupled to one AC network, a second PLC modem connected to a second AC network, and a data communication link between said first PLC modem and said second PLC modem. Alternatively, the central PLC transmitter itself may include equipment similar to that of the transponder for direct, isolated connections to each of multiple AC networks. Different control channel bands may be used for different AC networks and/or within an AC network.

Example Environments

Traditional airfield strip lighting systems using powerline communications over AC power lines with DC powered lighting elements may be limited to 1,000 feet of AC powerline cabling due to, for example, absorption by AC/DC converters of the control signals superimposed on the AC power signal. The use of filters, such as bandpass and low-pass filters at the inlet of the AC/DC converters helps to reduce the absorption of control signals, and thereby prevent signal loss and extend the range of the systems.

Electrical filters between AC power lines and AC/DC converters of lighting modules may be selected for the rejection of specific control bands, e.g., centering on control carrier frequencies within from circa 30 kHz to 800 kHz. Filters may include, for example, inductive elements in the range of 0.2 to 1 mH.

The range may alternatively or additionally be enhanced via command retransmission by lighting modules and/or transponder devices, and retransmissions may be facilitated through the use of blackout period and/or retransmission setback timers.

The lengths of lighting commands may vary. However, PLC communication packets may be as short as 100 mS, 10 mS, or shorter, allowing for near-real-time control of lighting, even allowing for retransmissions.

The lengths of lighting commands may vary. For example, a PLC control transmitter may direct a command to an individual lighting module, to a sub-group, or to all modules on a set of AC power lines. The command may contain explicit lighting instructions, e.g., as to on/off state, intensity, color, strobe pattern, strobe rate, etc., or may contain a reference to a lighting protocol to be followed by lighting modules, e.g., in accordance with a pre-loaded configuration. Lighting actions taken by the lighting modules may be based on instructions from the PLC control transmitter and/or pre-programmed.

Similarly, blackout and retransmission timer settings may be sent by the PLC control transmitter to an individual lighting module, subgroup of lighting modules, or all modules on a set of AC power lines. Timer actions taken by the lighting modules may be based on instructions from the PLC control transmitter and/or pre-programmed.

The use of control signal band filtration and/or retransmission techniques can significantly extend the practical length of a set of AC power lines for use in airfield lighting system, e.g., up to 10,000 feet long or longer, with an overall system approx. 200-300 elements within a two-mile area.

We claim:

1. A system comprising:
    a first set of AC power lines;
    a first set of lighting modules, each lighting module comprising a Powerline Communication (PLC) circuitry connected to the first set of AC power lines, a digital controller connected to the PLC circuitry, an AC powerline interface connected to the first set of AC power lines, an AC/DC power converter connected to the AC powerline interface, and a DC lighting element connected to the AC/DC power converter, wherein the DC lighting element is controlled by the digital controller;
    a PLC control transmitter, comprising the PLC circuitry connected to the first set of AC powerlines, a processor connected to the PLC circuitry, a memory connected to the processor, and computer-executable instructions stored in the memory which, when executed by the processor, cause the PLC control transmitter to send, toward the first set of lighting modules on a first control signal band via the first set of AC power lines, lighting commands pertinent to an operation of one or more lighting modules of the first set of lighting modules, wherein:
    the AC powerline interface of each lighting module of the first set of lighting modules comprises electrical filtering substantially blocking an absorption of signals in the first control signal band; and
    the digital controller of each lighting module is adapted to ignore, after receiving a first command from the PLC control transmitter, subsequent commands from the PLC control transmitter for a first period of time.

2. The system of claim 1, wherein the digital controller of each lighting module is adapted to determine, based on the first command from the first command from the PLC control transmitter, the first period of time.

3. The system of claim 1, wherein the digital controller of each lighting module is adapted to retransmit, via the PLC circuitry of the lighting module and after a second period of time, content based on the first command from the PLC control transmitter.

4. The system of claim 1, wherein the digital controller of each lighting module is adapted to determine, based on the first command from the first command from the PLC control transmitter, a second period of time.

5. The system of claim 1, wherein:
    the computer-executable instructions of the PLC control transmitter further cause the PLC control transmitter to send, toward the first set of lighting modules on a second control signal band via the first set of AC power lines, additional lighting commands pertinent to the operation of the one or more lighting modules of the first set of lighting modules; and
    the second control signal band is distinct from the first control signal band.

6. The system of claim 1, further comprising:
    a second set of AC power lines;
    a second set of lighting modules connect to the second set of AC power lines; and
    a PLC control transponder comprising a first PLC circuitry connected to the first set of AC powerlines, a second PLC circuitry connected to the second set of AC powerlines, and the computer-executable instructions stored in the memory which, when executed by the processor, cause the PLC control transponder to:
    receive, via the first PLC circuitry of the PLC control transponder, incoming lighting commands from the first set of AC power lines; and
    send, toward the second set of lighting modules on a second control band via the second PLC circuitry of the PLC control transponder and based on the incoming lighting commands, repeated lighting commands.

7. An aircraft field lighting system comprising:
    a set of AC power lines;
    a set of lighting modules, each lighting module comprising a Powerline Communication (PLC) circuitry connected to the set of AC power lines, a digital controller connected to the PLC circuitry, an AC powerline interface connected to at least one of the set of AC power lines, an AC/DC power converter connected to the AC powerline interface, an isolation transformer connected to the AC powerline interface, and a DC lighting element connected to the AC/DC power converter, wherein the DC lighting element is controlled by the digital controller;
    a PLC control transmitter, comprising the PLC circuitry connected to the plurality of AC powerlines, a processor connected to the PLC circuitry, a memory connected to the processor, and computer-executable instructions stored in the memory which, when executed by the processor, cause the PLC control transmitter to send, toward the first set of lighting modules on a plurality of control signal bands via the plurality of AC power lines, lighting commands pertinent to an operation of one or more lighting modules of the plurality of lighting modules, wherein:
the AC powerline interface of each lighting module of the set of lighting modules comprises electrical filtering substantially blocking the absorption of signals in the control signal band.

* * * * *